United States Patent
Watson

(10) Patent No.: US 8,170,595 B2
(45) Date of Patent: May 1, 2012

(54) HANDS-FREE MODE FOR A HALF-DUPLEX COMMUNICATIONS SYSTEM

(75) Inventor: John Mahony Watson, Berkshire (GB)

(73) Assignee: Vodafone Group PLC, Newbury, Berkshire (GB)

( * ) Notice: Subject to any disclaimer, the term of this patent is extended or adjusted under 35 U.S.C. 154(b) by 358 days.

(21) Appl. No.: 11/573,880

(22) PCT Filed: Aug. 17, 2005

(86) PCT No.: PCT/GB2005/003216
§ 371 (c)(1),
(2), (4) Date: Aug. 28, 2007

(87) PCT Pub. No.: WO2006/018635
PCT Pub. Date: Feb. 23, 2006

(65) Prior Publication Data
US 2008/0045257 A1    Feb. 21, 2008

(30) Foreign Application Priority Data

Aug. 18, 2004  (GB) .................................. 0418504.7

(51) Int. Cl.
H04B 7/00    (2006.01)
(52) U.S. Cl. ........ 455/518; 455/519; 455/520; 455/90.2
(58) Field of Classification Search .................. 455/90.2, 455/412.1, 414.1, 518–520; 370/352, 389, 370/338, 328
See application file for complete search history.

(56) References Cited

U.S. PATENT DOCUMENTS

| | | | |
|---|---|---|---|
| 6,018,668 A | 1/2000 | Schmidt et al. | |
| 6,563,804 B1 | 5/2003 | Iyer et al. | |
| 7,069,032 B1 * | 6/2006 | El-Fishawy | 455/517 |
| 2003/0078064 A1 | 4/2003 | Chan | |
| 2004/0179689 A1 * | 9/2004 | Maggenti et al. | 380/270 |
| 2005/0032539 A1 * | 2/2005 | Noel et al. | 455/518 |
| 2005/0143135 A1 * | 6/2005 | Brems et al. | 455/564 |
| 2005/0220079 A1 * | 10/2005 | Asokan | 370/352 |
| 2005/0260988 A1 * | 11/2005 | Kauppinen | 455/435.3 |
| 2005/0265350 A1 * | 12/2005 | Narasimha et al. | 370/395.2 |

FOREIGN PATENT DOCUMENTS

| | | |
|---|---|---|
| GB | 2271247 | 4/1994 |
| WO | WO03/100372 | 12/2003 |
| WO | WO2004/039088 | 5/2004 |

* cited by examiner

Primary Examiner — Dominic E Rego
(74) Attorney, Agent, or Firm — Workman Nydegger

(57) ABSTRACT

A half-duplex communication system is embodied in a push-to-talk cellular system such as a GPRS system. The system includes two or more terminals (1 A, 1 B, 1 C) one or more of which can operate in a hands-free mode. When in hands-free mode, a terminal (1 A) is offered the right-to-speak by a controller (11 A, 13 A, 15 A, 17 A) within the system without the need for a talk request from a user. This allows a hands-free user to participate safely in a communications session.

17 Claims, 1 Drawing Sheet

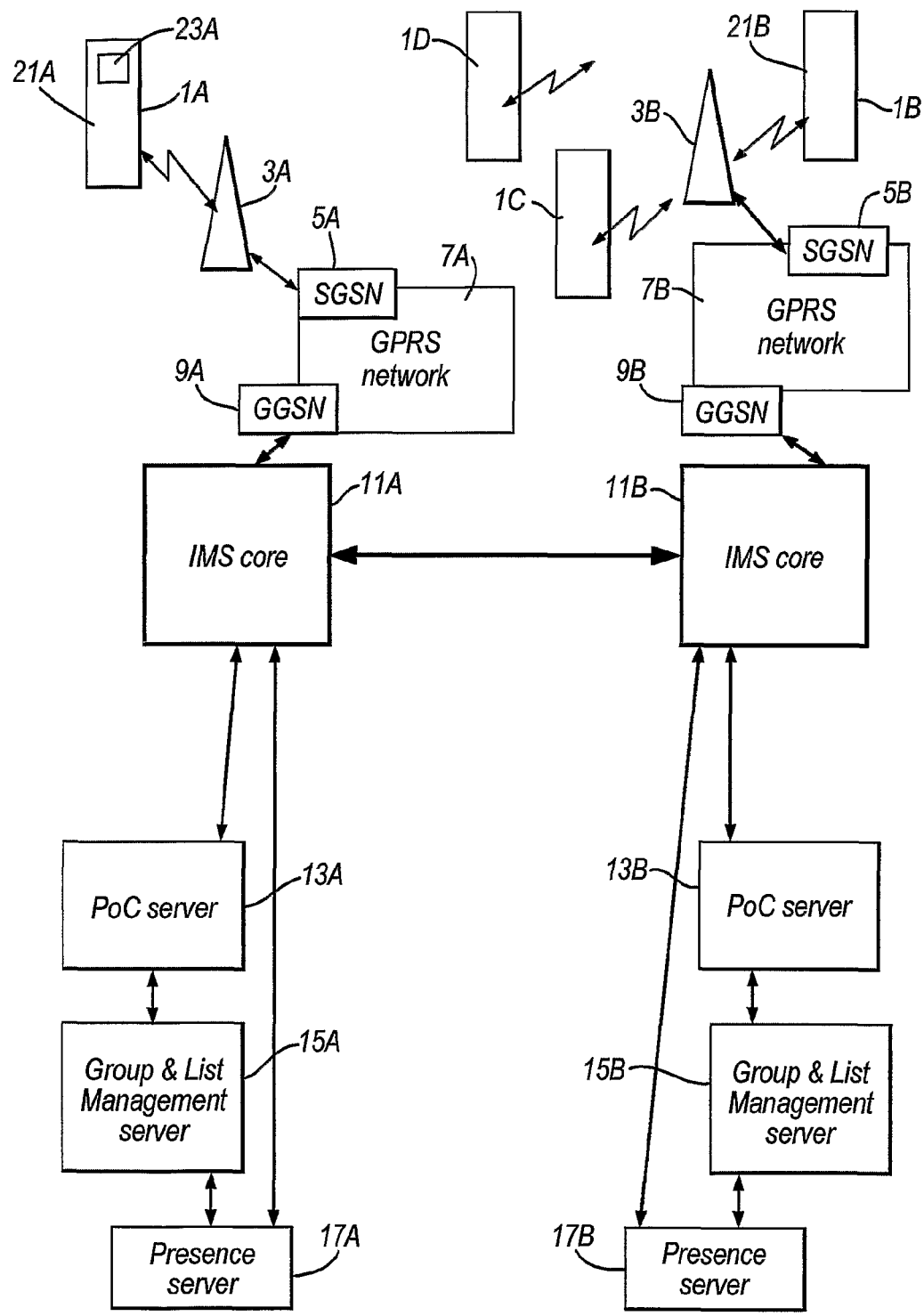

HANDS-FREE MODE FOR A HALF-DUPLEX COMMUNICATIONS SYSTEM

FIELD OF THE INVENTION

The invention relates to half-duplex telecommunication systems and particularly, but not exclusively, to push-to-talk over cellular (PoC).

RELATED TECHNOLOGY

A half-duplex communication system such as PoC includes at least two terminals for transmitting and receiving voice data. These terminals communicate with each other over the system allowing a communication session to be established between the terminals or with a group of terminals (if there are more than two terminals) such that a user of one of the terminals can speak and the users of the or each of the other terminals hear that person speak. Since the system is a half-duplex system, only one user can speak at a time. In view of this, it is necessary for a user to have the "right-to-speak". When one user has the right-to-speak, no other user can have that right.

As described in, for example, PCT/US2003/032531, the right-to-speak may be allocated by a server of the system in accordance with requests for the right-to-speak received from the devices. A similar system is described in PCT/US2003/013903.

It is a disadvantage of such systems that they require user action ("talk requests") before a user can acquire the right-to-speak. There may be circumstances where this is difficult or impossible for the user to generate a talk request. This might be the case, for example, when the terminal is in a hands-free mode.

A system is known from GB-A-2271247 that provides a voice detector in a mobile terminal that switches the terminal into transmit mode when a voice is detected and into receive mode when no voice is detected to allow half-duplex communication with a fixed unit operating in a full duplex system. U.S. Pat. No. 6,563,804 discloses a method of providing full-duplex communication in a half-duplex system by configuring an audio card to one of an idle state, a listen state and a talk state and transitioning the card between these states in response to events.

According to the invention, there is provided a method of controlling communication in a half-duplex communication system a method of controlling communication in a half-duplex communication system including a control device at least two terminals for transmitting and receiving voice data in communication sessions, the control device granting the right-to-speak to at least one of said terminals without action by a user of the terminal.

The grant of the right-to-speak by the control device without action by the user of the terminal, allows the user of to secure the right-to-speak without operating the terminal.

In a preferred embodiment of the invention, the least one terminal includes a hands-free mode, the right-to-speak being granted without user action when the terminal is in the hands-free mode. In this way, a user operating in hands-free mode can participate in a communication session without indicating the right-to-speak is required.

Following is a more detailed description on an embodiment of the invention, by way of example, reference being made to the accompanying drawing which is a schematic view of a Push-to-Talk over Cellular (PoC) system embodied in a General Packet Radio Service (GPRS) and including a plurality of terminals.

The third generation partnership project (3GPP) has recently defined a new concept known as IMS (IP—based Multimedia Subsystem). The aim of IMS is to allow users such as mobile telephone network operators to provide services to their subscribers as efficiently and effectively as possible. For example, the IMS architecture is likely to support the following communication types: voice, video, instant messaging, "presence" (a user's availability for contact), location-based services, email and web. Further communication types are likely to be added in the future.

This diverse collection of communication devices requires efficient session management due to the number of different applications and services that will be developed to support these communication types. The 3GPP have chosen Session Initiation Protocol (SIP) for managing these sessions.

The SIP protocol is a session-based protocol designed to establish IP based communication sessions between two or more end points or users. Once a SIP session has been established, communication between these end points or users can be carried out using a variety of different protocols (for example those designed for streaming audio and video). These protocols are defined in the SIP session initiation messages.

One application of IMS is push-to-talk over cellular (PoC). PoC allows a communication session to be established between a group of devices such that the user of one of the devices can speak and the users of each of the other devices will hear that person speak. During such a communication session each device functions like a two-way radio or walkie-talkie in a one-to-one or one-to-many group mode. Full duplex speech communication between the users of the respective devices during the communications session is not possible—only one user can speak at a time.

One feature of PoC is that, when the communication is established, there is an "always on" communication link between the devices. When a user wishes to talk to the or each of the other devices associated with the communication session, the user issues an appropriate instruction to their device (typically using a soft key—that is, a key whose function is programmable), and the user's speech is captured by their terminal and instantly, or within a relatively short period of time, is transmitted to the or each of the other terminals and is reproduced on those terminals. There is no requirement for the user inputting the speech data to dial the or each other device, and nor is there any requirement for the users of the devices receiving the speech to take any action to receive the speech data—it is automatically reproduced by their device when it is received (assuming, of course, the device is operating in an appropriate mode for allowing PoC communication).

PoC is described in the document "Push to talk over Cellular (PoC)—Architecture, Draft Version 1.0—13 Feb. 2004" available from Open Mobile Alliance Limited (OMA).

In the embodiment to be described a PoC communication session is established using IMS. However, it should be appreciated that a PoC communication session in accordance with the invention could be established over existing GSM/GPRS networks by exchange of data packets but without IMS.

One of the advantages of PoC is that less bandwidth may be required for a PoC call (which uses the packet switched domain) than a normal voice call (which uses the circuit switched domain). In a circuit switched call, network capacity is used for the full duration of the call from the initial connection attempt to the time that the call terminates. Network capacity is used even when no speech data is transmitted. In a PoC call only the actual blocks of data that contain speech will be transmitted. A PoC communication session between devices might last one hour. However, if speech is only transmitted for five minutes during that hour, only network capacity corresponding to that five minutes is used.

DETAILED DESCRIPTION

Referring to the drawing, a terminal in the form of a GPRS enabled mobile device 1A communicates wirelessly with radio network controller (RNC) 3A (in fact via a "node B", which is not shown for the sake of simplicity). A fixed (wired) connection between RNC 3A and serving GPRS support node (SGSN) 5A associated with mobile telecommunications network 7A allows packet data to be transmitted between the mobile device 1A and the mobile telecommunications network 7A in the packet switched domain. A gateway GPRS support node (GGSN) 9A provides an interface between the mobile telecommunications network 7A and IMS (SIP) core 11A. The IMS core 11A contains SIP proxys and SIP registers. PoC server 13A is coupled to the IMS core 11A for providing PoC functionality (to be described in more detail below).

Group and list management server 15A is responsible for the management of contact lists (containing the addresses of other users), group lists (containing the addresses of other groups), access lists and permissions management. A contact is an identity of a user, or a group. A contact includes the SIP URI or a TEL URI of the entity, type of the entity (user or group) and optionally the display name. Each PoC user has two access lists: a user accept list and user reject list. Access lists are used for controlling whether the PoC server is allowed or not allowed to send talk session requests to the user when requested by other user. Each PoC user can define permission management rules that describe who is allowed to contact him/her using the PoC service. The PoC Server implements the access control policy according to these defined rules.

A presence server 17A is provided to provide the IMS core 1A with information indicating whether or not devices associated with the mobile telecommunications network 7A are available for contact or not.

The drawing shows a second network including elements corresponding to the elements of the first network described above, which elements are designated by the same reference numeral but with the suffix "B". Data is exchanged between the IMS core 11A of the first network and the IMS core 11B of the second network using SIP signalling, which is transmitted, for example, via the Internet.

Of course, it should be appreciated that, although only one mobile device 1A and 1B, and one RNC 3A and 3B is shown associated with each mobile telecommunications network 7A and 7B, typically there will be a multiplicity of RNC's and mobile devices associated with each mobile telecommunications network 7A and 7B.

It is also important to note that, although in the embodiment described the mobile terminal 1A is associated with a different network 7A from the mobile terminal 1B, the invention is equally applicable to a scenario where the users of two mobile terminals associated with the same mobile telecommunications network wish to establish a PoC session.

It will now be described what happens when the user of mobile device 1A wishes to establish a PoC communication session with the user of mobile terminal 1B.

To establish a PoC communication session, the users of respective mobile devices will associate themselves in a group between which PoC messages may be sent by exchanging contact information and possibly other information (such as a password).

The user of mobile device 1A indicates that he/she wishes to establish a PoC communication session with the user of the mobile device 1B by sending a command from the mobile terminal 1A to the PoC server 13A, via RNC 3A, SGSN 5A, GGSN 9A and IMS core 11A. The PoC server 13A will then consult the group and list management server 15A and the presence server 17A to determine the allowability and availability of the mobile terminal 1B to take part in a PoC communication session (or this information may be obtained from the group list and management server 15B and presence server 17B of the network 7B via the link between the IMS cores 11A and 11B).

A PoC communication session is then established between mobile device 1A and mobile device 1B by the exchange of data between IMS cores 11A and 11B. The PoC servers 13A,13B make a record on each user's account with their network 7A,7B in order that an appropriate charge can be made (where necessary) for establishment of the PoC session.

In a PoC communication session there is only one PoC server performing a controlling PoC function. There could be more than one PoC server performing the participating PoC function in the PoC session. In the embodiment described, where there are only two devices in the PoC session, PoC server 13B will perform a controlling PoC function and a participating PoC function, and PoC server 13A will perform a participating PoC function.

The controlling PoC function:—
Provides centralized PoC session handling
Provides the centralized media distribution
Provides the centralized floor control functionality including talker identification (for arbitrating requests from PoC clients—devices 1A and 1B—for the right to speak)
Provides SIP session handling, such as SIP session organisation, termination, etc.
Provides policy enforcement for participation in group sessions
Provides the participants information
Collects and provides centralized media quality information
Provides centralized charging reports
The participating PoC function may:—
Provide PoC session handling
Provide the media relay function between PoC client (device 1A,1B) and controlling PoC server
Provide user media adaptation procedures
Provide the floor control message relay function between PoC client and controlling PoC server
Provide SIP session handling, such as SIP session origination, termination, etc. on behalf of the represented PoC client
Provide policy enforcement for incoming PoC session (e.g. access control, availability status, etc.)
Collect and provide media quality information
Provide the participant charging reports
The IMS cores 11A and 11B perform the following functions that are needed in support of the PoC service.
Route the SIP signalling between the PoC client (devices 1A and 1B) and the PoC server
Provide discovery and address resolution services
Support SIP compression
Perform authentication and authorization of PoC client based on user's service profile
Maintain the registration state
Provide charging information While the PoC communication session is established, the user of mobile terminal 1A can talk (that is, send speech data for reproduction on the device 1B) by pressing soft key 21A, above which, during the PoC communication session, the sign "press-to-talk" or "PTT" is displayed on the display 23A of the mobile terminal 1A. Of course, if more than one other terminal also joins the communication session, a plurality of soft keys may be provided, or a suitable graphical user interface provided, to allow entry of a command for speech data to be sent to any one of or all of the group of devices.

The mobile terminal 1A then issues a SIP INVITE message (message "1.") addressed to mobile device 1B (and, if intended for a group of devices, addressed to each of the other devices in the group) to IMS core 11A (via the intermediate elements shown in FIG. 1). Message "1." may include the following information elements:—
 a. contact identity information
 b. PoC address of the user initiating this PoC Session
 c. PoC service indication
 d. media parameters of PoC client A (device 1A)

The IMS core 11A passes the SIP INVITE message (message "2.") to the PoC server 13A, which checks the availability and allowability of the transmission of speech data to the device 1B by consulting group and list management server 15A/15B and presence server 17A/17B, and makes an appropriate record for charging for the transmission of speech data (if required). Message "2." may include:—
 a. contact identity information
 b. PoC address of the user initiating this PoC Session
 c. PoC service indication
 d. media parameters of PoC client A (device 1A)

If the availability and allowability criteria are met, the PoC server 13A then identifies that device 1B is not hosted by PoC server 13A, and it sends the SIP INVITE message (message "3.") to the IMS core 11A. Message "3." may include:—
 a. contact identity information
 b. PoC address of the user initiating the PoC session
 c. PoC service indication
 d. PoC server 13A (participating) selected media parameters The IMS core 11A transmits the SIP INVITE message (message "4.") to the IMS core 11B associated with the second mobile telecommunications network 7B. Message "4." may include:—
 a. contact identity information
 b. PoC address of the user initiating the PoC session
 c. PoC service indication
 d. PoC server 13A (participating) selected media parameters The IMS core 11B then transmits the SIP INVITE message (message "5.") to the PoC server 13B. Message "5." may include:—
 a. contact identity information
 b. PoC address of the user initiating the PoC session
 c. PoC service indication
 d. PoC server 13A (participating) selected media parameters The PoC server 13B may make an appropriate record on the account of the user of device 1B so that the user is charged for receipt of the speech data (if required). The PoC server 13B then generates an initiation message for the device 1B, which is sent to the IMS core 11B and transmitted to the mobile device 1B via GGSN 9B, SGSN 5A and RNC 3B.

A response message "auto answer indication" is received from the mobile device 1B (assuming it is in an area of coverage by the mobile telecommunications network 7B) and this is passed to the PoC server 13B via the intermediate elements shown in FIG. 1. A message "unconfirmed ok", advising of successful receipt of the SIP INVITE message by the device 1B, (message "6.") is transmitted from the PoC server 13B to the IMS core 11B, and from there to the IMS core 11A associated with the first mobile telecommunications network 7A (message "7."). The IMS core 11A of the first mobile telecommunications network transmits this message (message "8.") to the PoC server 13A. The message (message "9.") is returned to the IMS core 11A, from where it is forwarded to the mobile device 1A (message "10.").

Messages "6." to "8." may include P.C. server 13B selected media parameters. Messages "9." and "10." may include PoC server 13A selected media parameters.

Audio data received by the microphone of the mobile terminal 1A is then captured by that mobile terminal and is transmitted as packet data to the network 7A, and to the IMS core 11A, allowing the communication of this data to the IMS core 11B of the second network. This data is received by the mobile terminal 1B where it is automatically reproduced by the loudspeaker of that mobile terminal as an audio signal, allowing the user of mobile terminal 1B to receive and understand the speech of the user of mobile terminal 1A. The speech data is reproduced by the mobile terminal 1B without requiring any user operation by the user of mobile terminal 1B. Typically the speech data will be reproduced by the terminal 1B at virtually the same time as it is input to the mobile terminal 1A.

The mobile terminal 1B, for example, is capable of being operated in a hands-free mode. When the terminal 1B is in a PoC session and is in hands-free mode, this is noted by the server 13A as the controlling server. The information maybe communicated to the server 13A from the terminal 1B by a signal generated by the user or it may be sent as part of the SIP generated when the user logs onto the network.

When the server 13A notes that the terminal 1B in a PoC session is in hands-free mode, then the server 13A will offer the right-to-speak to the terminal 1B, without action by the user of the terminal 1B when the floor is clear i.e when the terminal 1A ceases talking. The availability of this right-to-speak may be indicated at the terminal 1B in any suitable way by, for example, the generation of an audible tone or the generation of a visual signal such as a light. If the user of the terminal 1B is using an ear piece, this could take the form of a continuous or intermittent background noise.

The server 13A maintains the right-to-speak with the terminal 1B for a limited period of time. This may, for example, be five seconds but could be any suitable time. During that time, the server 13A monitors the terminal 1B for the presence of speech data. In doing this, the server will need to filter out background noise. If the server 13A detects no speech data, then the server 13A will offer the right to speak to the next user who has made a talk request. If the server 13A detects the presence of speech data from the terminal 1B, then the server 13A will maintain the right-to-speak with that terminal 1B until speech data is no longer present. Then, again, the right-to-speak will be offered to the other terminal 1A.

It will be appreciated that there may be more than one terminal 1B in a PoC session in hands-free mode—for example three terminals 1B, 1C, 1D. In that event, once the floor is clear, the server 13A will offer the right-to-speak to the three hands-free terminals 1B, 1C, 1D in succession moving from one to the next when no voice data is detected or when a voice data session is concluded.

The server 13A may include a priority list that gives certain terminals 1A, 1B, 1C, 1D priority in the right-to-speak over other terminals 1A, 1B, 1C, 1D. In that case, the right-to-speak will be allocated in accordance with the priority list held by the server 13A. In this event, if the hands free terminal 1B has the right-to-speak and a talk request is made by a terminal 1A, 1C, 1D having a higher priority, the server 13A will remove the right-to-speak from that terminal 1B and pass it to the terminal with higher priority.

The priority list may also be used to determine the order in which the right-to-speak is granted to all the terminals in the PoC session including the hands-free terminals 1B, 1C, 1D.

It is possible, of course, that a server 13A to set a limit on the time a user is permitted to speak once the presence of voice data from a user has been noted by the server 13A.

It is possible for a terminal to be enabled for the transmission of speech data automatically on receipt of the right-to-speak from the server 13A. This means that the terminal user need take no action before commencing to speak.

It will be appreciated that the system described above need not be embodied in a GPRS system but could be embodied in any half-duplex capable communication system.

The invention claimed is:

1. A method of controlling communication in a half-duplex communication system including a control device and at least two terminals for transmitting and receiving voice data in communication sessions, the method comprising the control device granting the right-to-speak to at least one of said terminals without action by a user of the at least one of said terminals when the terminal is in a half-duplex communication session, wherein the user of the at least one of said terminals need not operate the terminal by pushing a button on the terminal in order for the right-to-speak to be granted to the terminal.

2. A method according to claim 1 further comprising providing to said terminal an indication that the right-to-speak has been granted.

3. A method according to claim 2 wherein the indication is a visual indication.

4. A method according to claim 2 wherein the indication is an audible indication.

5. A method according to claim 1 wherein the right-to-speak is granted to said terminal by the control device for a limited period of time and is removed after expiry of said limited period of time in the absence of voice data from said terminal.

6. A method according to claim 1 wherein said at least one terminal includes a hands-free mode, the right-to-speak being granted by the control device without user action when the terminal is in hands-free mode.

7. A method according to claim 6 wherein said at least one terminal sends a signal to said control device when the device is put into hands-free mode, the control device on receipt of said signal, granting said at least one terminal the right-to-speak without action by a user of the terminal.

8. A method according to claim 7 wherein the granting to said at least one terminal the right-to-speak switches said at least one terminal to a transmit mode.

9. A method according to claims 7 wherein said system includes two or more terminals having a hands-free mode, the control device receiving signals from said terminals when in hands-free mode and, when two or more said signals are received, granting the right-to speak to said terminals in succession.

10. A method according to claim 9 wherein the control device checks whether a terminal is transmitting voice data when the terminal has the right-to-speak and grants the right-to-speak to another terminal only if voice data is not being transmitted from said terminal.

11. A method according to claim 9 wherein the user of a terminal provides to the control device a signal indicating that the right-to-speak is not required, the control device on receipt of said signal granting the right-to-speak to another terminal.

12. A method according to claim 9 wherein the control device includes a priority list for right-to-speak rights for terminals communicating within the system, the control device granting the right-to-speak to said terminals in accordance with said list.

13. A method according to claim 6 wherein the control device receives requests for the right-to-speak from other terminals in the system, the control device checking whether said at least one terminal is communicating and granting the right-to-speak to one of said other terminals only if said at least one terminal is not transmitting voice data.

14. A method according to claim 1 wherein the communication system is a push-to-talk over cellular system.

15. A method according to claim 14 wherein the communication system is a GPRS system.

16. A method of controlling communication in a half-duplex communication system including a control device and at least two terminals for transmitting and receiving voice data in communication sessions, the method comprising:
   granting the right-to-speak to at least one of said terminals for a limited period of time; and
   removing the granted right-to-speak after expiry of said limited period of time in the absence of voice data from said terminal,
   wherein a user of the at least one of said terminals need not operate the terminal by pushing a button on the terminal in order for the right-to-speak to be granted to the at least one of said terminals.

17. A method according to claim 16 wherein the right-to-speak is granted to said terminal by the control device without action by a user of the terminal.

* * * * *